US007162248B2

(12) United States Patent
Nagato et al.

(10) Patent No.: US 7,162,248 B2
(45) Date of Patent: Jan. 9, 2007

(54) RADIO CONTROL APPARATUS, DATA COMMUNICATION CONTROL METHOD, AND MOBILE COMMUNICATION SYSTEM

(75) Inventors: Rie Nagato, Yokosuka (JP); Naoto Shimada, Yokosuka (JP); Osamu Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 847 days.

(21) Appl. No.: 10/396,492

(22) Filed: Mar. 26, 2003

(65) Prior Publication Data
US 2004/0203960 A1 Oct. 14, 2004

(30) Foreign Application Priority Data
Mar. 27, 2002 (JP) ............................. 2002-089386

(51) Int. Cl.
*H04Q 7/20* (2006.01)
(52) U.S. Cl. .................. 455/448; 455/426.1; 455/454; 455/552.1; 455/436; 455/443; 370/331
(58) Field of Classification Search ................ 455/448, 455/426.1, 454, 552.1, 436, 443; 370/331
See application file for complete search history.

(56) References Cited

U.S. PATENT DOCUMENTS 5,148,548 A * 9/1992 Meche et al. ................ 455/514
5,533,014 A * 7/1996 Willars et al. ............... 370/335
5,963,848 A * 10/1999 D'Avello ..................... 455/62
2002/0065072 A1 * 5/2002 Lindh ........................ 455/422

FOREIGN PATENT DOCUMENTS

JP          9-214460      8/1997
JP         10-327463     12/1998
JP       2001-258072      9/2001

* cited by examiner

*Primary Examiner*—Quynh H. Nguyen
(74) *Attorney, Agent, or Firm*—Oblon, Spivak, McClelland, Maier & Neustadt, P.C.

(57) ABSTRACT

A mobile communication system is provided that employs a data communication control method that includes a radio control apparatus that communicates with a mobile station that performs VOX control using a first frequency band area and a second frequency band area. Receiving a request for data transmission to the mobile station, the radio control apparatus determines whether radio wave transmission and reception are being performed with the mobile station in a communication operation using the first frequency band area. The radio control apparatus then determines a transmission time for data transmission in a communication operation using the second frequency band area, based on a communication pattern of the mobile station that is a data transmission destination designated by the request for data transmission. If radio wave transmission and reception are not being performed in the communication operation using the first frequency band area, the radio control apparatus transmits the requested data to the data transmission destination mobile station within the determined transmission time.

7 Claims, 11 Drawing Sheets

RADIO CONTROL APPARATUS, DATA COMMUNICATION CONTROL METHOD, AND MOBILE COMMUNICATION SYSTEM

BACKGROUND OF THE INVENTION

The present invention generally relates to data communication control methods employed in radio control apparatuses in mobile communication systems, and, more particularly, to a data communication control method for reducing interference among different communication systems without a deterioration in the data throughput characteristics.

The present invention also relates to a radio control apparatus that employs the above data communication control method, and a mobile communication system that includes the radio control apparatus.

In a case where the frequency band areas used by two communication systems utilizing different communication methods are close to each other, interference might be caused between the two communication operations.

In a W-CDMA/FDD technique that applies a FDD (Frequency Division Duplex) technique to a W-CDMA (Wideband-Code Division Multiple Access) technique, a frequency of 1,920 to 1,980 MHz is used for uplink transmission, while a frequency of 2,110 to 2,170 MHz is used for downlink transmission. In a W-CDMA/TDD technique that applies a TDD (Time Division Duplex) method to the W-CDMA method, the same frequency of 2,010 to 2,025 MHz is used for both uplink transmission and downlink transmission.

As described above, the uplink frequency band area of the W-CDMA/FDD technique is relatively close to the frequency band area of the W-CDMA/TDD technique. If a base station of one of the two communication systems is located in the vicinity of a base station of the other communication system, interference might be caused between the two communication operations through those base stations. Such an undesirable satiation can be prevented by employing a filter that reduces signal components outside a predetermined frequency band area.

Meanwhile, in a case where a mobile station utilizing the W-CDMA/FDD technique and a mobile station utilizing the W-CDMA/TDD method are located in the vicinity of each other and performing communication, the uplink communication by the W-CDMA/FDD technique might interfere with the downlink communication by the W-CDMA/TDD technique.

The interference is naturally caused in a dual mobile station that is compatible with a dual mode utilizing both the W-CDMA/FDD technique and the W-CDMA/TDD technique as communication systems, especially when the system utilizing the FDD method and the system utilizing the TDD method are used at the same time (this operation will be hereinafter referred to as a "multi call").

The interference can be avoided by improving the filtering performance of each of the W-CDMA/FDD transmission and reception devices and the W-CDMA/TDD transmission and reception devices so as to prevent generation of spurious signals or noise outside a predetermined band area and to minimize adverse interaction.

However, a filter that can realize excellent shutoff characteristics generally requires a large number of elements. This of course results in an increase of power consumption and an increase of size of the entire device. As there is an increasing demand for smaller mobile stations that consume less energy, it is difficult to employ such a filter as described above. Also, this problem apparently becomes more noticeable in a dual mobile station that includes transmission and reception devices of both methods.

In an attempt to reduce interference with no improvement in filtering performance, Japanese Patent Publication No. 2,830,914 discloses a method of controlling data transmission and reception timing so as to reduce interference. More specifically, the disclosed method involves VOX (Voice Operated Transmitter) control at a mobile station. Under the VOX control, a communication operation utilizing one of the two communication methods enters a transmission OFF state, and data transmission and reception are performed utilizing the other communication method while the other radio wave transmission and reception are suspended.

Here, the VOX control is a transmission output control operation that is to be performed while audio signals to be used for reducing power consumption at the mobile station are being input, and is performed to transmit encoded audio signals only in audible periods and to stop radio transmission in silent periods (see page 263 of "Digital Mobile Communication", supervising editor: Moriji Kuwabara, published by The Science News Ltd.).

The above data communication control method disclosed in Japanese Patent Publication No. 2,830,914 has the following problems.

First, in a case where one of the communication systems is performing data transmission and reception while the other communication system is not performing radio wave transmission and reception, the data to be transmitted or received by the other communication system may not be properly received due to interference when the former one of the communication systems resumes the radio wave transmission and reception. After demodulating reception signals, a mobile station normally requests for resend of lost data if there is any. As the amount of data loss due to interference increases, more requests for resend are issued. Frequent resending operations result in a rapid decrease of the throughput in the other communication system.

Secondly, some users may have a high ratio of the audio data transmission time to the entire communication time. In such a case, the transmission OFF period under the VOX control is very short, and accordingly, data transmission and reception might not be efficiently performed. As the accumulated transmission data cannot be promptly transmitted, the throughput of the data rapidly decreases.

SUMMARY OF THE INVENTION

A general object of the present invention is to provide radio control apparatuses and data communication control methods in which the above disadvantages are eliminated.

A more specific object of the present invention is to provide a radio control apparatus and a data communication method for controlling transmission and reception to prevent interference between two communication systems utilizing different communication techniques without a decrease of throughput in any communication operation in a mobile communication system. Here, the mobile communication system includes the two communication systems that have the respective frequency band areas close to each other and are located so close to each other that interference might be caused between the two communication operations.

The above objects of the present invention are achieved by a method of controlling data communication of a radio control apparatus that performs communication with a mobile station using a first frequency band area and a second frequency band area in a mobile communication system, the mobile station performing control to stop radio wave transmission while maintaining a communication line when there is no data to be transmitted. This method includes the steps of:

receiving a request for data transmission to the mobile station;

determining whether radio wave transmission and reception are being performed with the mobile station in a communication operation using the first frequency band area;

determining a transmission time for data transmission in a communication operation using the second frequency band area, based on communication pattern information as to a mobile station that is designated as a data transmission destination by the request for data transmission; and transmitting the requested data to the mobile station as the data transmission destination within the determined transmission time, when determining that radio wave transmission and reception are not being performed in the communication operation using the first frequency band area.

By this method, a silent period of time in a communication operation using one of the two frequency band areas can be estimated while data transmission is being performed in a communication operation using the other one of the frequency band areas. A control operation is performed so that the data transmission in the communication operation using the latter one of the two frequency band areas can be completed within the estimated silent period of time. Thus, the probability of interference being caused between the two communication systems can be dramatically reduced.

The above objects of the present invention are also achieved by a method of controlling data communication of a radio control apparatus that performs communication with a mobile station using a first frequency band area and a second frequency band area in a mobile communication system, the mobile station performing control to stop radio wave transmission while maintaining a communication line when there is no data to be transmitted. This method includes the step of resending data that are transmitted to a mobile station as a data transmission destination in a communication operation using the second frequency band area after radio transmission and reception with the mobile station are started in a communication operation using the first frequency band area while data are being transmitted to the mobile station in the communication operation using the second frequency band area, the data being resent to the mobile station as the data transmission destination.

By this data communication control method, even when interference is caused due to a multi-call situation, the next data transmission is resumed by resending the data that was being transmitted at the start of the multi call. Thus, it is possible to prevent such an undesirable situation that the throughput of a communication operation using one of the two frequency band areas is decreased due to the resend control in a communication operation using the other one of the two frequency band areas.

The above objects of the present invention are also achieved by a radio control apparatus that employ either of the above data communication control methods.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

In the following embodiments, a mobile communication system and a dual mobile station that utilize the W-CDMA/FDD technique and the W-CDMA/TDD technique and are compatible with multi-call operations are employed as an example of a case where the frequency band areas of two communication systems utilizing different communication methods are close to each other, and interference might be caused between the communication operations performed by the two communication systems.

First Embodiment

Referring first to FIGS. 1 through 5, a mobile communication system and a data communication control method employed in the mobile communication system in accordance with a first embodiment of the present invention will be described in detail.

In the following, the above two communication systems will be described as separate systems that are independent of each other, for ease of explanation.

Figure 1:
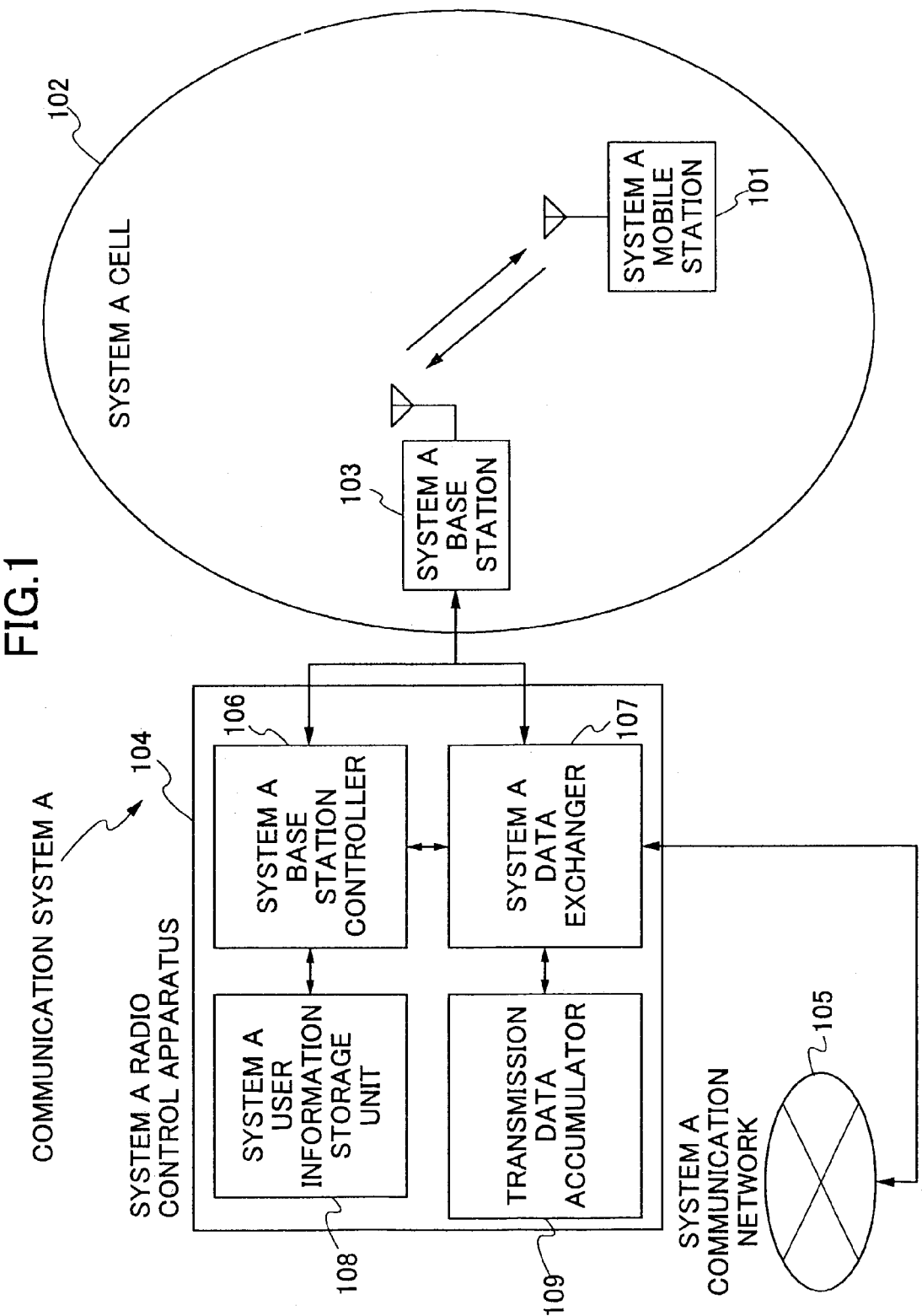
FIG. 1 schematically illustrates the entire structure of a communication system in accordance with a first embodiment of the present invention.

FIG. 1 schematically illustrates the entire structure of one of the above two communication systems (a communication system that utilizes the W-CDMA/TDD technique, for example, which will be hereinafter referred simply as the "communication system A"). In the example shown in FIG. 1, the communication system A includes a system A mobile station 101 that performs radio communication with base stations and utilizes communication services provided by the communication system A, a system A base station 103 that performs radio communication with mobile stations within a system A cell 102 and provides the communication services to the mobile stations, and a system A radio control apparatus 104 that controls and manages the base stations. The system A base station 103 is connected to a system A communication network 105 via the system A radio control apparatus 104.

The above example structure is simplified for ease of explanation. In practice, there may be more than one system A mobile station 101 and more than one system A base station 103. Also, the system A radio control apparatus 104 may control and manage more than one system A base station 103.

The system A radio control apparatus 104 includes a system A base station controller 106 that controls the base stations, a system A data exchanger 107 that intermediates between the system A base station 103 and the system A communication network 105 exchanging data with each other, a system A user information storage unit 108 that stores user information, and a transmission data accumulator 109 that temporarily accumulates data to be transmitted from the system A communication network 105 to the system A mobile station 101 via the system A radio control apparatus 104 and the system A base station 103.

Figure 2:
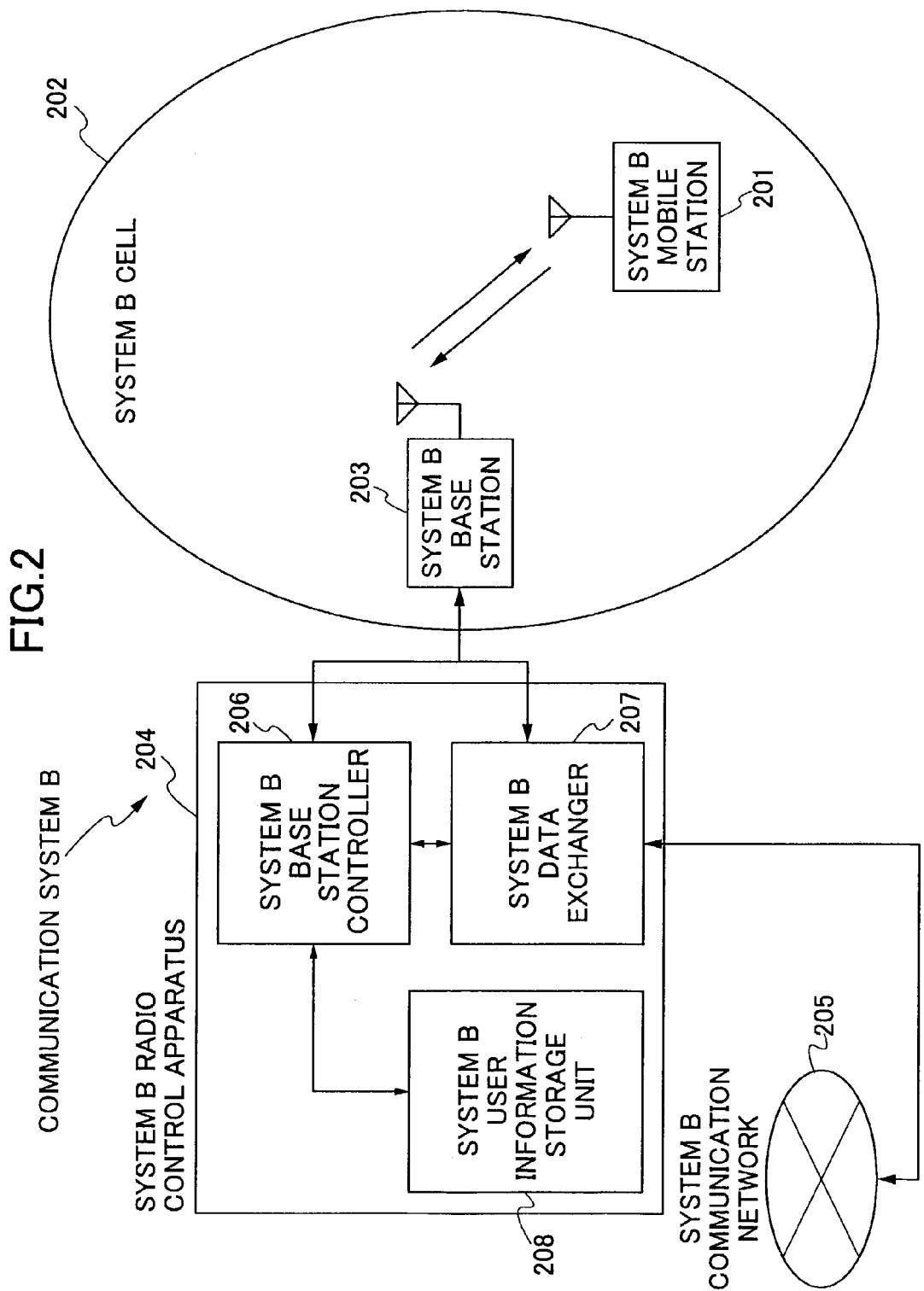
FIG. 2 schematically illustrates the entire structure of another communication system in accordance with the first embodiment.

FIG. 2 schematically illustrates the entire structure of the other one of the two communication systems (a communication system that utilizes the W-CDMA/FDD technique, for example, which will be hereinafter referred to simply as the "communication system B"). In the example shown in FIG. 2, the communication system B includes a system B mobile station 201 that performs radio communication with base stations and utilizes communication services provided by the communication system B, a system B base station 203 that performs radio communication with mobile stations within a system B cell 202 and provides the communication services to the mobile stations, and a system B radio control apparatus 204 that controls and manages the base stations. The system B base station 203 is connected to a system B communication network 205 via the system B radio control apparatus 204.

The above example structure is also simplified for ease of explanation. In practice, there may be more than one system B mobile station 201 and more than one system B base station 203. Also, the system B radio control apparatus 204 may control and manage more than one system B base station 203.

The system B radio control apparatus 204 includes a system B base station controller 206 that controls the system B base station 203, a system B data exchanger 207 that intermediates between the system B base station 203 and the system B communication network 205 exchanging data with each other, and a system B user information storage unit 208 that stores user information.

Figure 3:
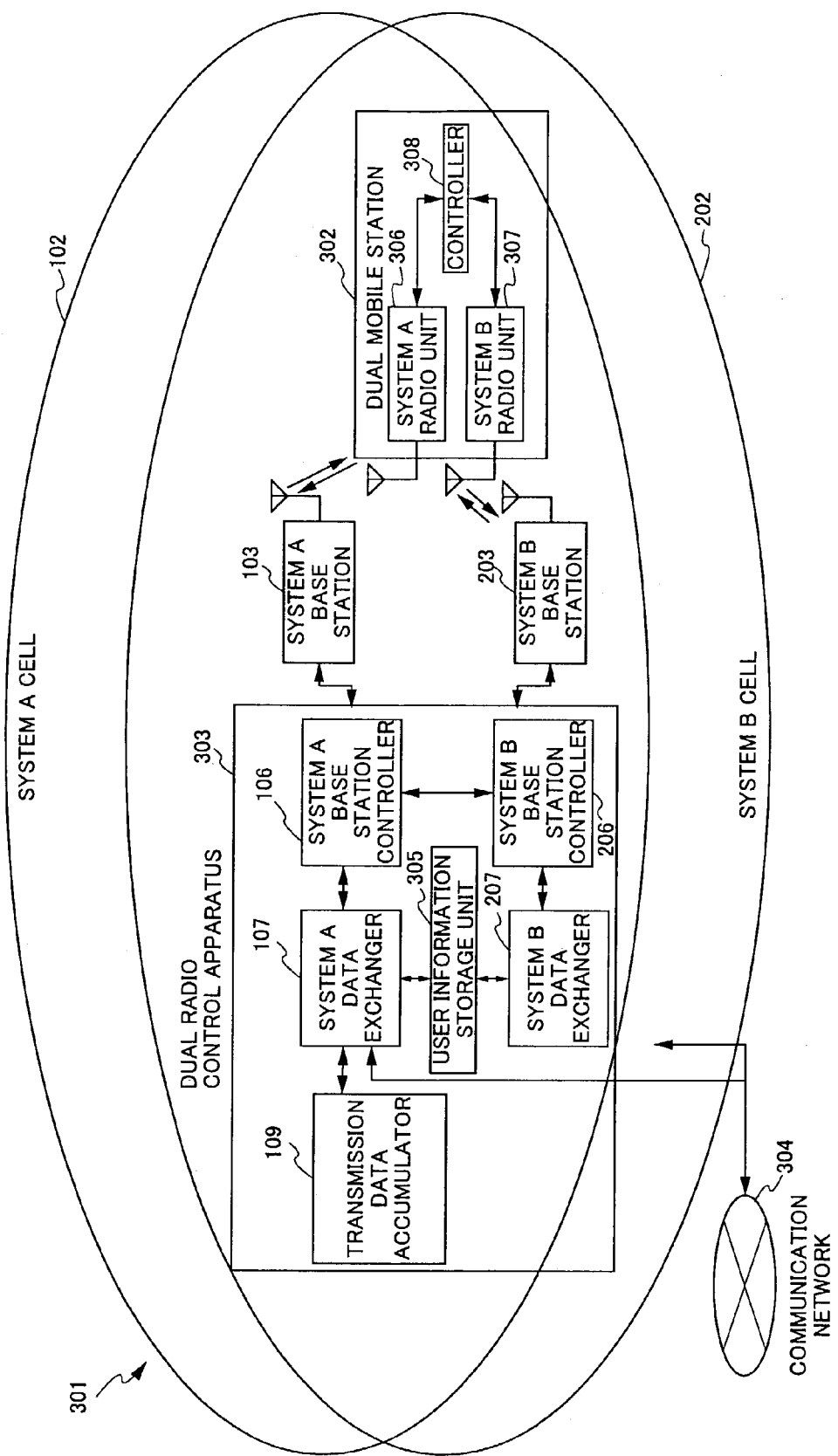
FIG. 3 schematically illustrates the entire structure of a mobile communication system in accordance with the first embodiment.

Referring now to FIG. 3, a mobile communication system that realizes multi-call services with the above two communication systems A and B in accordance with this embodiment will be described. In FIG. 3, the same components as the components shown in FIGS. 1 and 2 are denoted by the same reference numerals as the corresponding reference numerals in FIGS. 1 and 2, and explanation of those components will be omitted in the following description.

A mobile communication system 301 that is provided with the communication system A and the communication system B includes a dual mobile station 302, the system A base station 103 that is a part of the system A cell 102, the system B base station 203 that is a part of the system B cell 202, and a dual radio control apparatus 303 that is compatible with both the communication system A and the communication system B. The system A base station 103 and the system B base station 203 are connected to a communication network 304 via the dual radio control apparatus 303.

This example structure is also simplified for ease of explanation. In practice, there may be more than one dual mobile station 302. Also, there may be more than one system A base station and more than one system B base station 203. Further, the dual radio control apparatus 303 may control and manage more than one system A base station and more than one system B base station 203 in the respective communication systems A and B.

The dual radio control apparatus 303 includes the system A base station controller 106, the system B base station controller 206, the system A data exchanger 107 that intermediates between the system A base station 103 and the communication network 304 exchanging data with each other, the system B data exchanger 207 that intermediates between the system B base station 203 and the communication network 304 exchanging data with each other, a user information storage unit 305 that stores user information, and the transmission data accumulator 109 that temporarily accumulates data to be transmitted from the communication network 304 to the dual mobile station 302 via the dual radio control apparatus 303 and the system A base station 103. In this manner, the dual radio control apparatus 303 has the structure of the system A radio control apparatus 104 shown in FIG. 1 and the structure of the system B radio control apparatus 204 shown in FIG. 2 combined.

The dual mobile station 302 includes a system A radio unit 306 that performs radio communication with the system A base station 103, a system B radio unit 307 that performs radio communication with the system B base station 203, and a controller 308 that collectively controls the system A radio unit 306 and the system B radio unit 307.

In the following, a data communication control method employed in the above mobile communication system in accordance with this embodiment will be described. As shown in FIG. 3, the dual mobile station 302 is located in an area where the system A cell 102 overlaps with the system B cell 202. Accordingly, the dual mobile station 302 can utilize the communication system A and the communication system B at the same time. In this mobile communication system, the communication system B utilizes the VOX control, transmitting radio waves (such as audio signals) during a transmission ON period and suspending the radio wave transmission during a transmission OFF period.

Even in a case where the communication system A performs data transmission and reception only while the communication system B is in a transmission OFF period under VOX control to avoid interference at the time of a multi call, interference might be caused when the communication system B is switched to a transmission ON state under VOX control during the data transmission and reception process performed by the communication system A.

To avoid such an undesirable situation, a radio control apparatus estimates the duration of each silent period in the communication system B (in other words, the period of time during which transmission is not performed under VOX control), and data transmission and reception are performed by the communication system A only for the estimated duration of the silent period, in accordance with the data communication control method of this embodiment.

Figure 4:
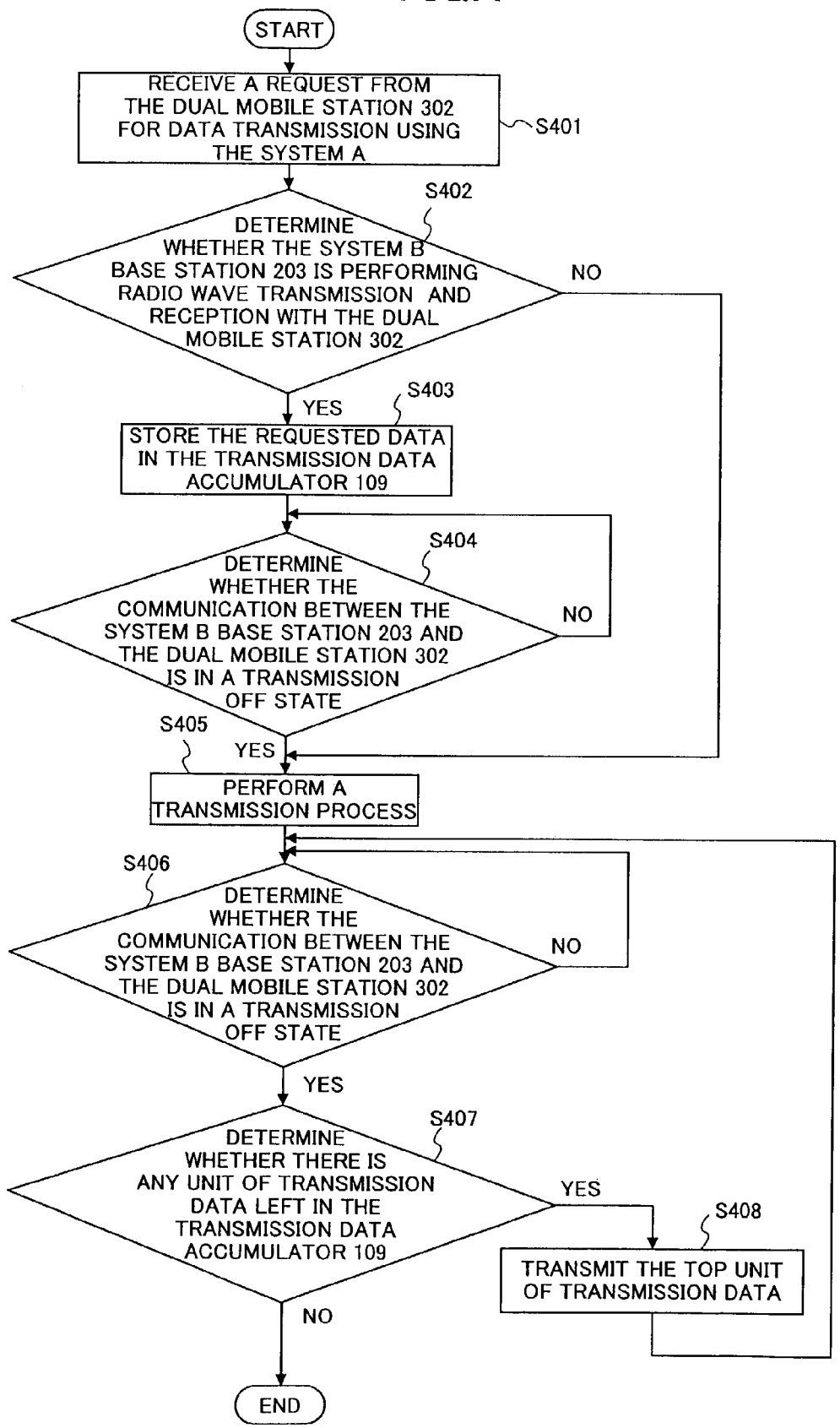
FIG. 4 is a flowchart of an operation performed by a data communication control method in accordance with the first embodiment.
Figure 5:
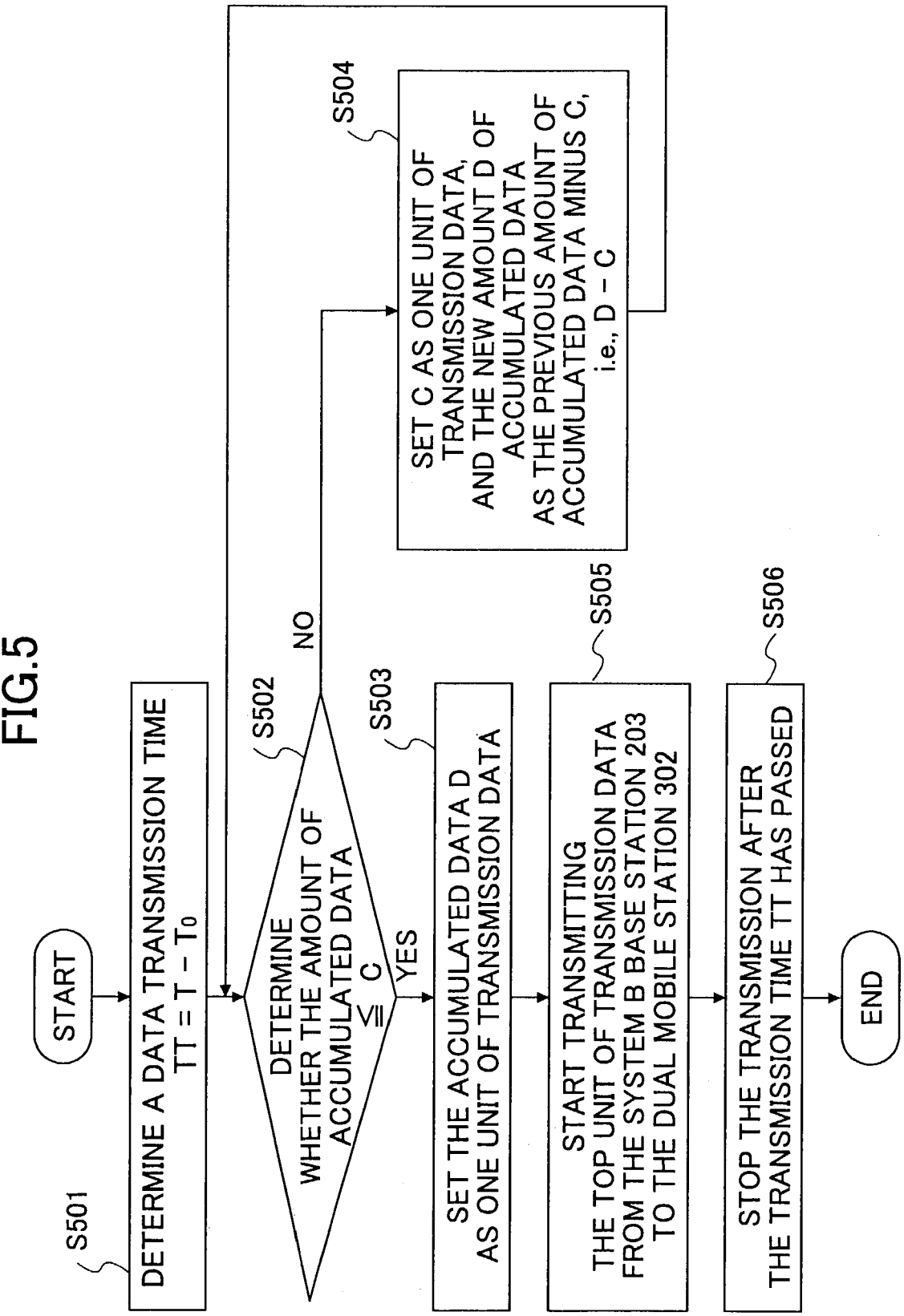
FIG. 5 is a flowchart of a transmission process in accordance with the first embodiment.

Referring now to FIGS. 4 and 5, the data communication control method of this embodiment will be described. FIG. 4 is a flowchart of an operation performed in accordance with the data communication control method of this embodiment. FIG. 5 is a flowchart of a transmission process in accordance with the data communication control method of this embodiment.

In the present invention, the communication pattern of each mobile station is normally used for estimating the duration of each silent period. In this embodiment, however, the "average silent period" is used as an example of the communication pattern for estimating the duration of each silent period. The "average silent period" is a parameter that indicates the average duration of silent periods in each communication operation performed by each mobile station (or each user), and is recorded as the average silent time t in the user information storage unit 305. Each silent period measurement value may be, for example, the silent time in a communication operation that has just ended. After the end of the communication operation, the silent time may be transmitted from the dual mobile station 302 to the user information storage unit 305 of the dual radio control apparatus 303, or may be measured by the system B base station controller 206. The average silent time stored in the user information storage unit 305 may be constantly rewritten with the latest data (i.e., the silent time that has just been received). The average value of the latest data and the already recorded value may be stored in the user information storage unit 305. The received value and all the recorded values may be weighted in accordance with the total duration of communication operations, and the weighted values may be added up and recorded in the user information storage unit 305. It is also possible to obtain the average silent time as user information from a network and record the average silent time in the user information storage unit 305.

In the initial state in the flowchart of FIG. 4, the dual mobile station 302 is performing audio communication in the communication system B through the system B base station 203. When a request for data transmission is transmitted from the dual mobile station 302 (step S401), it is determined whether the system B base station 203 is performing radio wave transmission and reception with the dual mobile station 302 (step S402).

If the system B base station 203 is not performing radio wave transmission and reception with the dual mobile station 302 ("NO" in step S402), the system A base station controller 106 determines that the operation is in a transmission OFF state under VOX control, and transmits the requested data immediately to the dual mobile station 302 via the system A base station 103 (step S405). This transmission process will be described later in greater detail.

On the other hand, if radio wave transmission and reception are being performed between the system B base station 203 and the dual mobile station 302 ("YES" in step S402), the system A base station controller 106 obtains the data requested by the dual mobile station 302 from, for example, the communication network 304, and stores the requested data in the transmission data accumulator 109 (step S403).

The dual radio control apparatus 303 stands by until the radio wave transmission and reception are intermitted though the system B base station 203 and the dual mobile station 302 are still line-connected to each other (i.e., a transmission OFF state under VOX control). When the radio transmission and reception are intermitted ("YES" in step S404), the process of transmitting the data accumulated in the transmission data accumulator 109 is performed (S405).

Referring now to FIG. 5, the transmission process of step S405 in the flowchart of FIG. 4 will be described in detail.

When the transmission process starts, the system A base station controller 106 obtains the average silent time t of the dual mobile station 302, which has requested the data transmission, from the user information storage unit 305 to calculate the data transmission time $tt=t-t_0$ (step S501). Here, $t_0$ represents such an offset value of the average silent time t that the probability of the actual silent time becoming equal to or longer than tt is higher than a predetermined rate (for example, 90%), with the probability of the actual silent time becoming equal to or longer than t being 50%. Using this offset value, the actual silent time can be almost always longer than the data transmission time tt. Accordingly, the transmission data can be transmitted within the data transmission time tt, so that the probability of interference due to the silent period ending and an audible period starting (i.e., the audio communication resuming) during the data transmission can be lowered.

The system A base station controller 106 then calculates the maximum data amount C that can be transmitted in the data transmission time tt, and compares the maximum data amount C with the amount of data that has just been obtained or has been accumulated (hereinafter referred to simply as the "accumulated data D") (step S502). Here, the maximum data amount C may be set below the maximum amount of data that is logically transmittable, so as to avoid concurrence of a data transmission period and an audible period.

If the amount of the accumulated data D is equal to or smaller than the maximum data amount C ("YES" in step S502), the accumulated data D are set as one unit of transmission data to be transmitted in the data transmission time tt (step S503), and data transmission to the dual mobile station 302 is started via the system A base station 103 (step S505).

If the amount of the accumulated data D is greater than the maximum data amount C ("NO" in step S502), the same amount of data as the maximum data amount C in the accumulated data D is set as one unit of transmission data, and the remainder of the accumulated data D are set as new accumulated data D (step S504). The operation then returns to step S502, in which the new amount of the accumulated data D is again compared with the maximum data amount C. Accordingly, steps S502 and S504 are repeated, so that accumulated data that are greater than the maximum data amount C can be divided into multiple units of transmission data by the maximum data amount C.

Of the multiple units of transmission data, the top unit of transmission data is transmitted (step S505), and the remaining units of transmission data are accumulated in the transmission data accumulator 109.

The process of transmitting one unit of transmission data is completed within the data transmission time tt (step S506). The data transmission time tt is the estimated silent time. Transmission data are divided into multiple units of transmission data that can be transmitted within the data transmission time tt, so that each transmission process is completed within the data transmission time tt. In this manner, the probability that data transmission is completed within a silent period can be increased, and interference can be reduced.

Referring back to FIG. 4, after the transmission process of step S405 is completed, the system A base station controller 106 stands by until the radio wave transmission and reception in the communication system B are intermitted (step S406). If the transmission and reception in the communication system B are intermitted again ("YES" in step S406), the system A base station controller 106 determines whether there are any of the multiple units of transmission data accumulated in the transmission data accumulator 109 (step S407). If there is one or more units of transmission data accumulated in the transmission data accumulator 109 ("YES" in step S407), the top one of the units of transmission data is transmitted in the same manner as the procedures of steps S505 and S506 (step S408).

If there are no units of transmission data accumulated in the transmission data accumulator 109 ("NO" in step S407), the operation comes to an end. If the next request for data transmission is transmitted from the dual mobile station 302, the operation of course returns to step S402 and repeats the same procedures as above.

As described above, the length of each silent period is estimated from the average silent period of each mobile station (or each user), and control is performed so that each data transmission process is completed within the estimated silent period. Thus, the probability of concurrence of data transmission in the communication system A and audio communication in the communication system B can be reduced, and accordingly, the probability of interference can be reduced.

Second Embodiment

Figure 6:
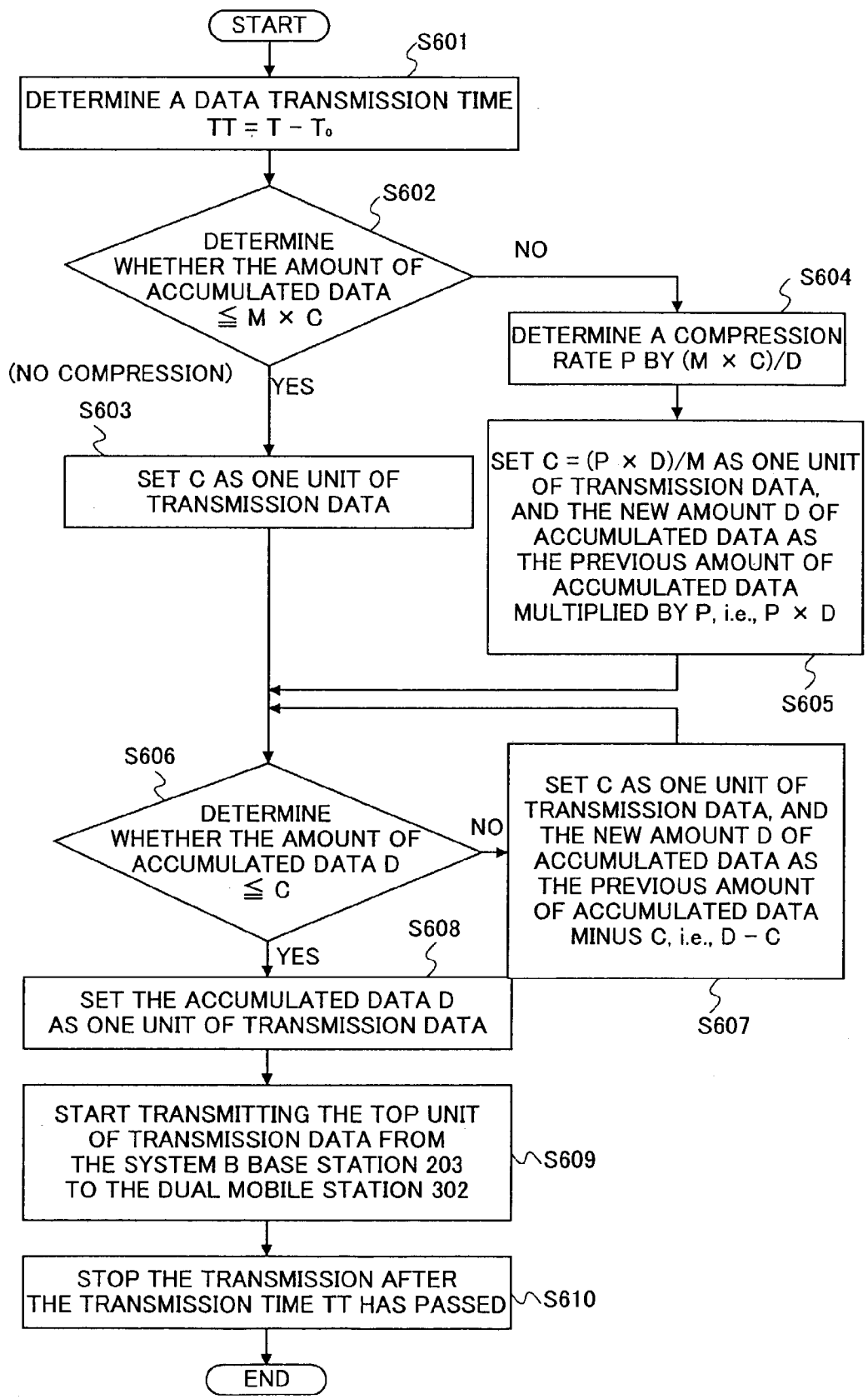
FIG. 6 is a flowchart of a transmission process in accordance with a second embodiment of the present invention.
Figure 7:
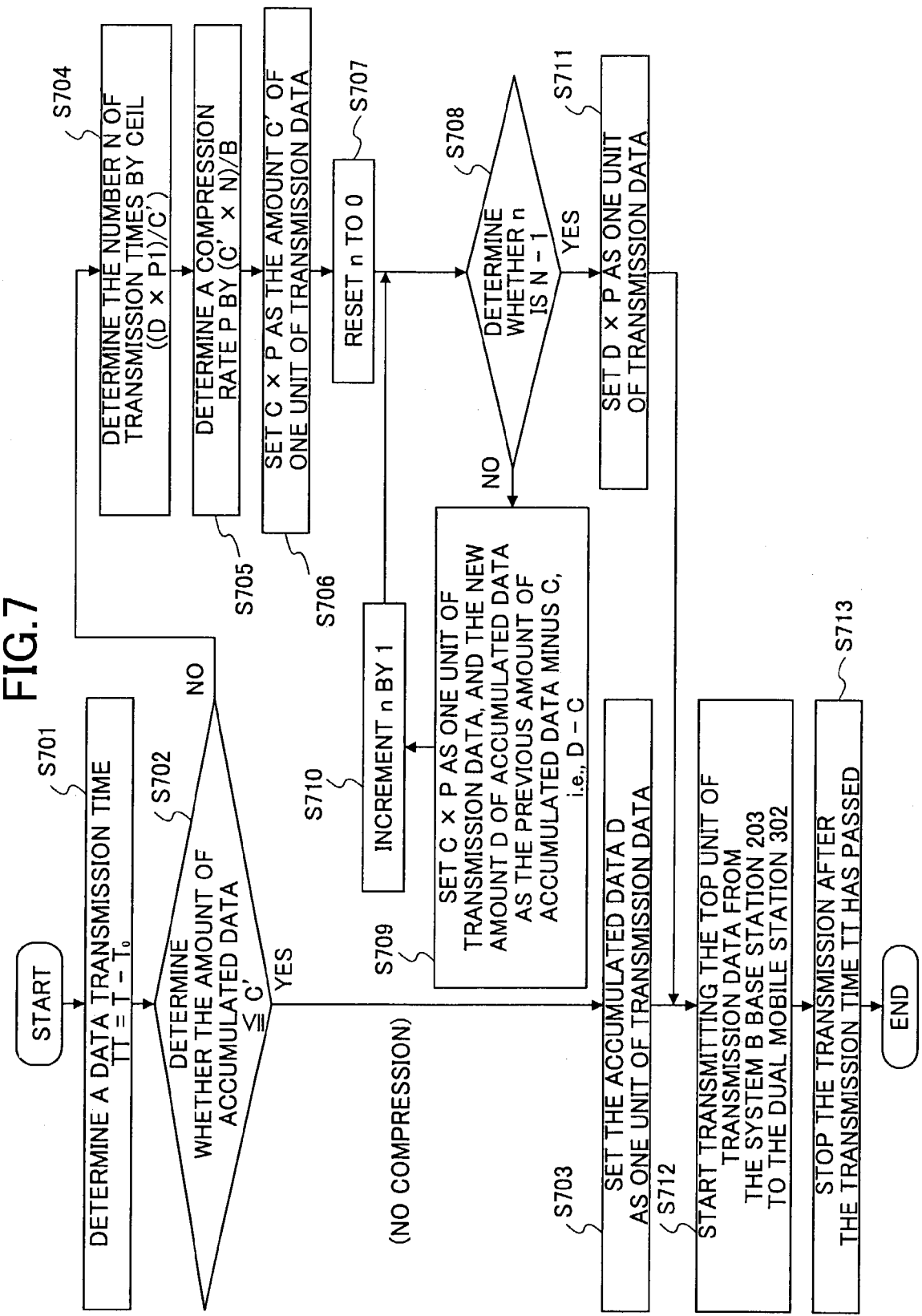
FIG. 7 is a flowchart of another transmission process in accordance with the second embodiment.
Figure 8:
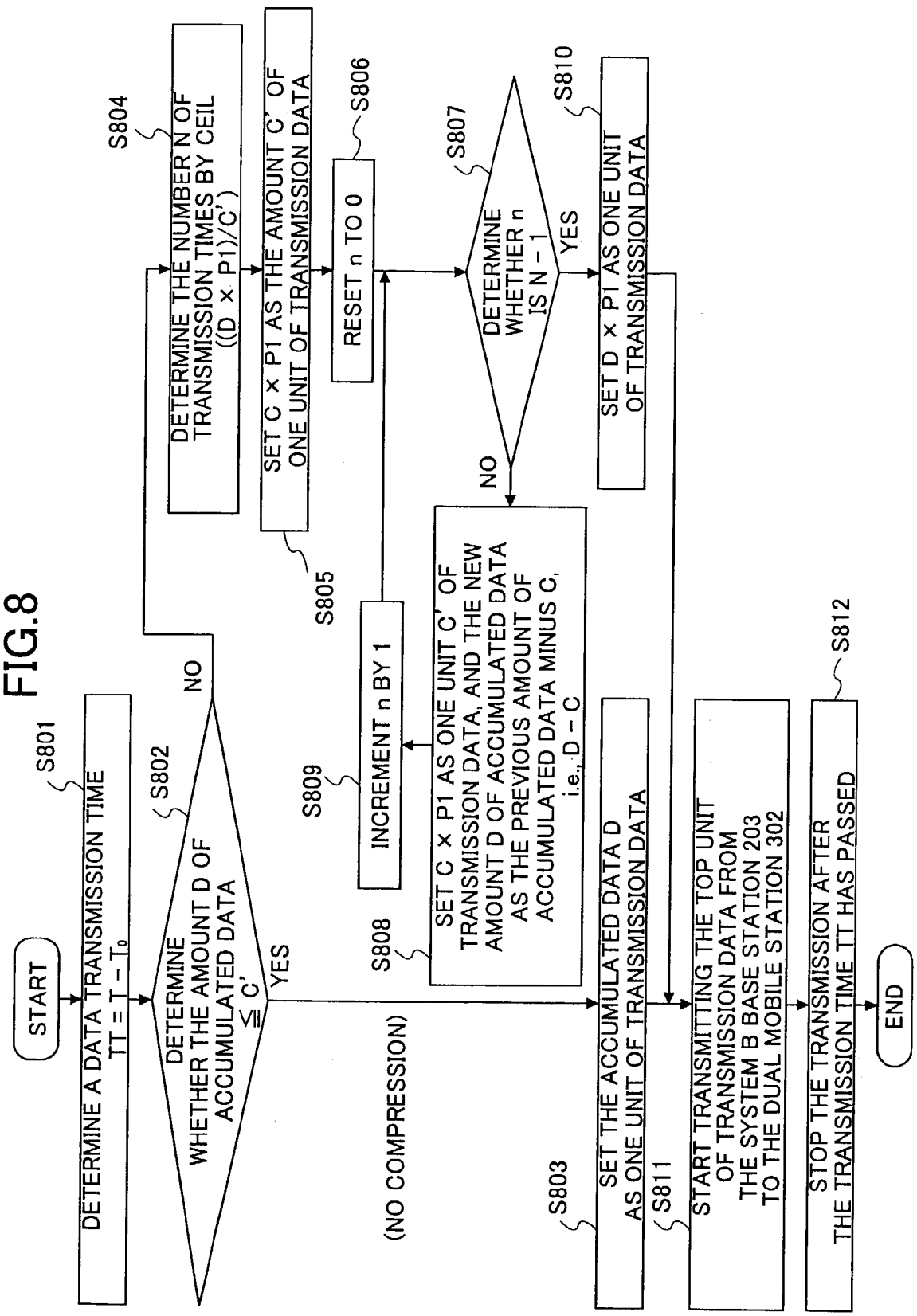
FIG. 8 is a flowchart of yet another transmission process in accordance with the second embodiment.

Referring now to FIGS. 6 through 8, a mobile communication system and a data communication control method in accordance with a second embodiment of the present invention will be described.

This embodiment involves the same mobile communication system as the mobile communication system shown in FIG. 3 and the same operation as the operation performed by the data communication control method of the first embodiment. However, this embodiment further involves a transmission data compression process as well as the dividing process in the transmission process.

FIGS. 6 through 8 are flowcharts of transmission processes in accordance with the second embodiment. Each of these transmission processes is equivalent to step S405 in the flowchart of FIG. 4.

Referring first to FIG. 6, a transmission process in which the maximum number of units of divided transmission data is set will be described as an example of the transmission process in accordance with this embodiment. If the number of units of divided transmission data is large, it takes a long time to complete the transmission of all the data. To shorten the total time required for transmitting all the data, the maximum number of units of divided transmission data is set.

When the transmission process starts, the system A base station controller 106 obtains the average silent time t of the dual mobile station 302, which has transmitted the request for data transmission, from the user information storage unit 305, and then calculates the data transmission time $tt=t-t_0$ (step S601).

The system A base station controller 106 determines whether the amount of the accumulated data D is equal to or smaller than M×C (step S602). Here, M is the predetermined maximum number of units of divided transmission data, and C is the maximum amount of transmission data that is transmittable in the transmission time tt. If the amount of the accumulated data D is equal to or smaller than M×C ("YES" in step S602), the accumulated data D can be divided by C into a smaller number of units than the maximum number of units of divided transmission data, and therefore, it is not necessary to compress the accumulated data D. The amount of one unit of transmission data is set as C (step S603), and the operation proceeds to the next step.

On the other hand, if the amount of the accumulated data D is greater than M×C ("NO" in step S602), the number of units of divided transmission data exceeds the maximum number M unless a compression process is also performed. For this reason, the operation moves on to a step of determining a compression rate p (step S604). Here, the compression rate p is determined so as to be equal to or smaller than (M×C)/D, i.e., $p \times D \leq M \times C$. The accumulated data D are compressed at the compression rate p, i.e., p×D. The data amount of one unit of transmission data C is then determined by (p×D)/M, and the new amount of compressed accumulated data D is set as p×D (step S605).

The procedures following step S605 are the same as the procedures of S502 through S506 in the flowchart of FIG. 5, and therefore, explanation of those procedures is omitted in this description.

By the above transmission process combined with the compression process, the same control effect as the first embodiment can be achieved even if there is a limit to the number of data units.

Referring now to FIG. 7, a transmission process in which the compression rate is limited and the amount of each unit of divided data is uniform will be described as an example of the transmission process in accordance with this embodiment.

When the transmission process starts, the system A base station controller 106 obtains the average silent time t of the dual mobile station 302, which has transmitted the request for data transmission, from the user information storage unit 305, and then calculates the data transmission time $tt=t-t_0$ (step S701).

The system A base station controller 106 determines whether the amount of the accumulated data D is equal to or smaller than C' (step S702). Here, C' represents the amount of data that can be transmitted in the transmission time tt. If the amount of the accumulated data D is equal to or smaller than C' ("YES" in step S702), there is no need to perform the compression process, and the accumulated data D is set as one unit of transmission data (step S703).

On the other hand, if the amount of the accumulated data D is greater than C' ("NO" in step S702), the compression process is performed. To even the data amounts in all units of divided transmission data, an integer N is determined so that (P1×D)/C' is smaller than the integer N but is as close to the integer N as possible (step S704). Here, the integer N represents the number of transmission processes (i.e., the number of units of divided transmission data), P1 is the maximum compression rate, and ceil(x) is a function that changes a value x to an integer closest to the value X but not greater than the value x.

After the number N of transmission processes is determined, a compression rate p is determined by (C'×N)/D, so that the number of units of divided transmission data becomes equal to N (step S705). As the compression rate p determined here is smaller than the maximum compression rate P1, the limit on the compression rate can be maintained.

After the compression rate p is determined, the amount of transmission data to be transmitted in one transmission process, i.e., the data amount C' in a transmission data unit is determined by C×p (step S706).

In steps S707 through S710, the accumulated data D are divided by C, and the data amount of each unit of divided data is multiplied by the compression rate p to obtain the data amount C'. Here, a variable n is introduced and set at an initial value 0 (step S707). Until the variable n reaches N−1 (step S708), a unit amount C of transmission data is repeatedly removed from the accumulated data D, and is then compressed at the compression rate p to generate a unit amount C' of transmission data (step S709). After one compression process is completed, the variable n is incremented by 1 (step S710). When the variable n reaches N−1 ("YES" in step S708), the remaining accumulated data D are compressed at the compression rate p, and are set as the last unit of transmission data (step S711).

The procedures in steps S712 and S713 are the same as the procedures in steps S505 and S504 in the flowchart of FIG. 5, and therefore, explanation of those procedures is omitted in this description.

By the above transmission process in which data are evenly divided, the same control effect as the first embodiment can be achieved even if there is a limit on the compression rate.

Referring now to FIG. 8, a transmission process in which a maximum compression rate is set, and the largest possible amount of data is transmitted at the maximum compression rate, will be described as an example of the transmission process in accordance with this embodiment.

When the transmission process starts, the system A base station controller 106 obtains the average silent time t of the dual mobile station 302, which has transmitted the request for data transmission, from the user information storage unit 305. The system A base station controller 106 then calculates the data transmission time tt=t−$t_0$ (step S801).

The system A base station controller 106 determines whether the amount of the accumulated data D is equal to or smaller than C' (step S802). Here, C' represents the amount of data that can be transmitted in the transmission time tt. If the amount of the accumulated data D is equal to or smaller than C' ("YES"' in step S802), there is no need to perform a compression process, and the accumulated data D are set as one unit of transmission data (step S803).

On the other hand, if the amount of the accumulated data D is greater than C' ("NO" in step S802), a compression process is performed. To transmit the largest possible amount of data at the maximum compression rate P1, an integer N is determined so that (P1×D)/C' is smaller than the integer N but is as close to the integer N as possible (step S804). Here, N is the number of transmission processes (i.e., the number of units of divided transmission data), P1 is the maximum compression rate, and ceil (x) is a function that changes a value x to an integer closest to the value x and not greater than the value x.

After the number N of transmission processes is determined, the unit amount C' of transmission data is determined by C×P1 (step S805).

In steps S806 through S809, the accumulated data D are divided by C, and each unit of divided data is multiplied by the maximum compression rate P1 to obtain the unit amount C' of transmission data. First, a variable n is introduced and is set at an initial value 0 (step S806). Until the variable n reaches N−1 (step S807), a unit amount C of transmission data is repeatedly removed from the accumulated data D, and is compressed at the compression rate P1 to generate a unit amount C' of transmission data (step S808). When one compression process is completed, the variable n is incremented by 1 (step S809). When the variable n reaches N−1 ("YES" in step S807), the remaining accumulated data (normally smaller than C) are compressed at the compression rate P1, and are set as a unit of transmission data (step S810).

The procedures in steps S811 and S812 are the same as the procedures in steps S505 and S506 in the flowchart of FIG. 5, and therefore, explanation of those procedures is omitted in this description.

In the example shown in FIG. 8, the compression rate can be changed from P1 only when the Nth unit of transmission data is transmitted. In that case, the compression rate p(N) for the transmission of the Nth unit can be determined by dividing the remaining data amount by the unit amount C' of transmission data that can be transmitted at once, i.e., p(N)=(D−(C'×(N−1)/P1)/C'.

By the above transmission process in which the largest possible amount of data is compressed at the maximum compression rate, the same control effect as the first embodiment can be achieved even if there is a limit on the compression rate.

As described above, each next silent period is estimated from the average silent period of each mobile station (or each user), and a control operation is performed so that each one unit of data transmission can be transmitted within the estimated silent period in the examples shown in FIGS. 6 through 8. In this manner, the probability of data transmission of the communication system A overlapping with audio communication of the communication system B can be lowered, and accordingly, the probability of interference can also be lowered.

Third Embodiment

Figure 9:
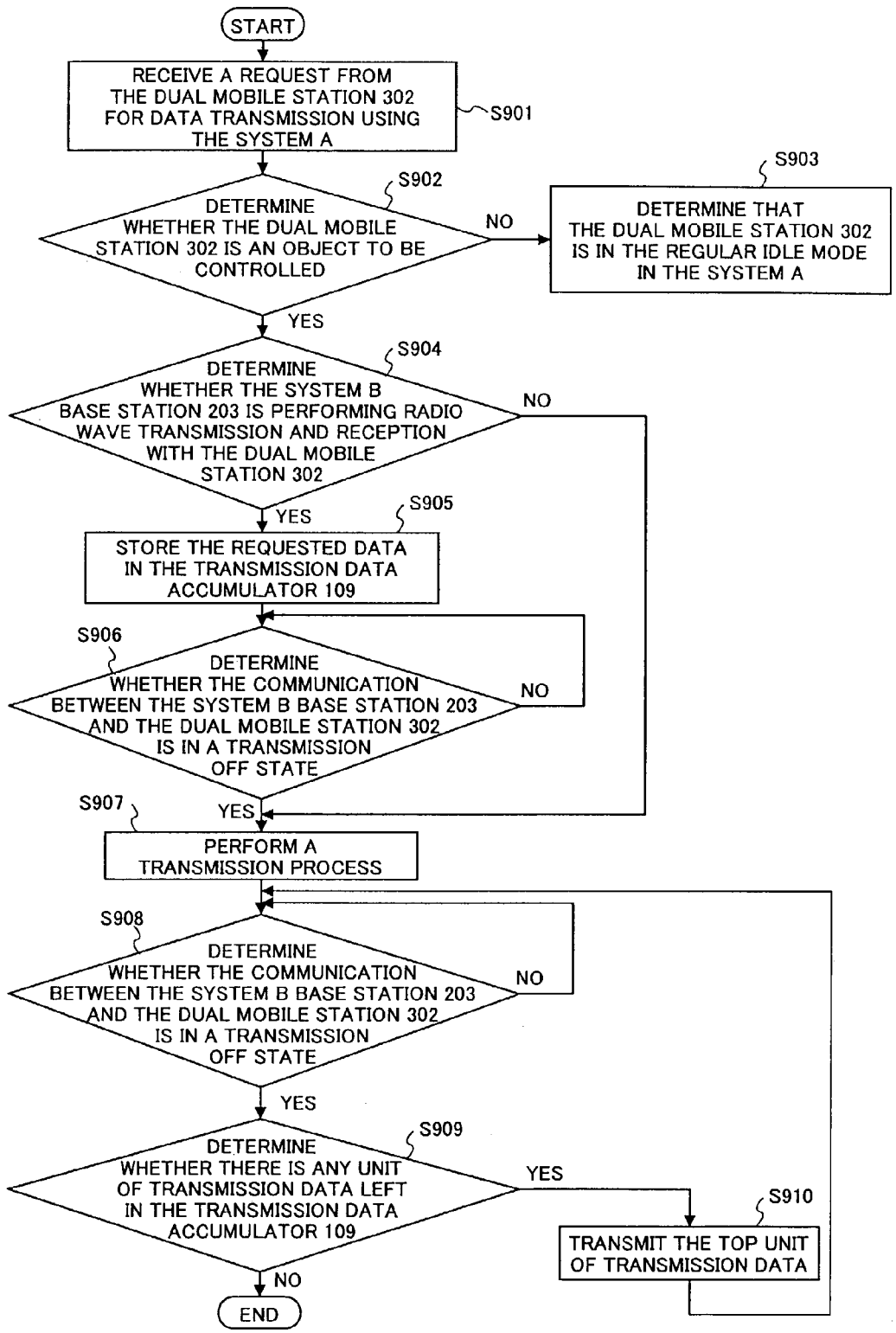
FIG. 9 is a flowchart of an operation performed by a data communication control method in accordance with a third embodiment of the present invention.

Referring now to FIG. 9, a mobile communication system and a data communication control method employed in the mobile communication system in accordance with a third embodiment of the present invention will be described. The mobile communication system of this embodiment is substantially the same as the mobile communication system in accordance with the first embodiment shown in FIG. 3. FIG. 9 is a flowchart of an operation performed by the data communication control method in accordance with this embodiment.

As already mentioned, a transmission OFF period under VOX control may become very short, depending on the audio communication pattern used by the user, and the throughput of data transmission and reception deteriorates at the time of a multi call. To avoid such an undesirable situation, a dual mobile station having a long audible period in which audio input from the user is recognized is removed from a group of objects to be controlled by this data communication control method, judging from the communication pattern of each user.

In this embodiment, the "average silent period" or the "audible rate" is used as the index of the communication pattern of each user. For example, the audible rate is a parameter that can be determined by dividing "the period of time in which the user of the mobile station is emitting sound" by "the connection time".

Each audible rate may be transmitted to the user information storage unit 305 of the radio control apparatus 303 from the dual mobile station 302 immediately after the communication to which the audible rate belongs, or may be measured by the system B base station controller 206. The audible rate recorded as the communication pattern of the user in the user information storage unit 305 may be constantly rewritten with the latest data (i.e., the audible rate that has just been received) or with the average value of the already recorded value and the latest data. Alternatively, the audible rate may be obtained as information as to the user from a network, and be recorded in the user information storage unit 305.

In the initial state in the flowchart of FIG. 9, the dual mobile station 302 is performing audio communication with the system A base station 203. A request for data transmission through the system A base station 103 in the communication system A is transmitted from the dual mobile station 302 (step S901).

Receiving the request for data transmission from the dual mobile station 302, the system A base station controller 106 refers to the user information storage unit 305, and obtains average silent period data or audible rate data of (the user of) the mobile station that has transmitted the request. The system A base station controller 106 then compares the average silent period data or the audible rate data with a predetermined reference value (step S902). Here, the reference value is used for checking the length of each relay period of radio transmission and reception. For instance, if the audible rate of the dual mobile station 302 is higher than the reference value, the dual mobile station 302 is determined to have a long audible period. If the average silent period of the dual mobile station 302 is shorter than the reference value, the dual mobile station 302 is determined to have a relatively short radio wave relay period.

If determined to have a long audible period, the dual mobile station 302 is removed from the group of objects to be controlled by this data communication control method ("NO" in step S902).

The dual mobile station 302 that has been removed from the group of objects to be controlled enters the regular idle mode in the communication system A (step S903).

On the other hand, if the dual mobile station 302 is allowed to remain in the group of objects to be controlled ("YES" in step S902), the operation moves on to step S904. The procedures of steps S904 through S910 are the same as the procedures of steps S402 through S408 in the flowchart of FIG. 4, and therefore, explanation of those procedures is omitted in this description. Also, the transmission process of step S907 may be the same as any of the corresponding steps in the flowcharts of FIGS. 5 through 8.

As described above, in this embodiment, attention is directed to the communication pattern of each mobile station (or each user), and data communication control is not performed on a mobile station that has a long audible period and may decrease the throughput of data transmission and reception. Thus, inefficient data transmission and reception can be prevented.

Although either the average silent period or the audible rate is used as a parameter in determining whether each dual mobile station can remain in the group of objects to be controlled in the above example, both the average silent period and the audible rate may be used at the same time.

Fourth Embodiment

Figure 10:
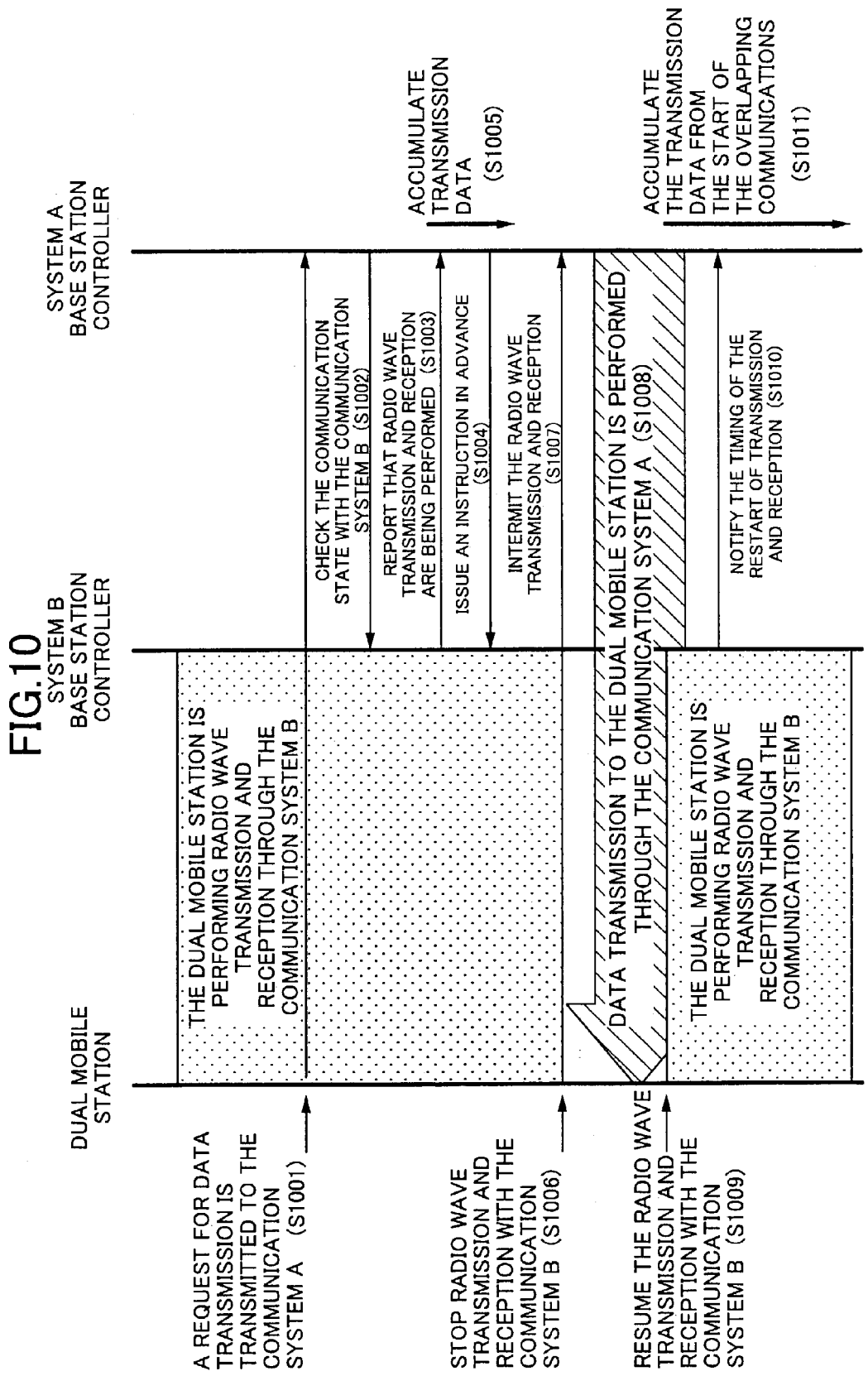
FIG. 10 is a sequence diagram of an operation performed by a data communication control method in accordance with a fourth embodiment of the present invention.

Referring now to FIG. 10, a mobile communication system and a data communication control method in accordance with a fourth embodiment of the present invention will be described.

In this embodiment, data to be transmitted when and after data transmission by the communication system A starts overlapping with audio communication by the communication system B are buffered by a dual radio control apparatus for later transmission. By doing so, the need to resend the data from the transmission origin can be eliminated, even if the audio communication is resumed during the data transmission.

The data communication control method of this embodiment is employed in the same mobile communication system as that shown in FIG. 3, and can be employed alone or in combination with any of the data communication control methods of the first to third embodiments.

FIG. 10 is a sequence diagram of an operation performed in accordance with the data communication control method of this embodiment.

In the initial state, the dual mobile station 302 is performing radio wave transmission and reception through the system B base station 203 in the communication system B.

A request for data transmission via the system A base station 103 in the communication system A is transmitted from the dual mobile station 302 (step S1001). The requested data may be contents on the WEB, image data, audio data, or e-mail messages. The request for data transmission is sent to the system A base station controller 106.

Receiving the request for data transmission from the dual mobile station 302, the system A base station controller 106 inquires of the system B base station controller 206 the communication status of the dual mobile station 302 using the communication system B (step S1002).

The system B base station controller 206 reports to the system A base station controller 106 that the dual mobile station 302 is in the state of radio transmission and reception using the communication system B (step S1003).

Receiving the report, the system A base station controller 106 instructs the system B base station controller 206 in advance to notify the system A base station controller 106 when the radio wave transmission and reception are intermitted (or ended) (step S1004). Here, intermittence of the radio wave transmission and reception is a state in which the user of the dual mobile station 302 line-connected to the other end is not emitting sound (i.e., a silent state). In other words, when the radio wave transmission and reception are intermitted, the operation is switched to a transmission OFF state under VOX control.

After receiving the report in step S1003, the system A base station controller 106 also obtains the transmission data for the dual mobile station 302 (i.e., the data requested for transmission in step S1001) from the communication network 304, for example. The system A base station controller 106 temporarily stores (buffers) the obtained transmission data in the transmission data accumulator 109, and stands by until the transmission is turned OFF under VOX control (step S1005).

When the radio wave transmission and reception between the dual mobile station 302 and the system B base station 203 are intermitted (step S1006), the system B base station controller 206 notifies the system A base station controller 106 of the intermittence in accordance with the instruction issued in step S1004 (step S1007).

Receiving the notification in step S1007, the system A base station controller 106 transmits the requested transmission data temporarily stored in the transmission data accumulator 109 to the dual mobile station 302 (step S1008).

Through the procedures of steps S1001 through S1008, the control operation can be performed so that the communication system A performs data transmission and reception with the dual mobile station 302 when the communication system B is in a transmission OFF state under VOX control.

In the data communication control method of this embodiment, when radio wave transmission from the dual mobile station 302 to the system B base station 203 is resumed (step S1009), the system B base station controller 206 further notifies the system A base station controller 106 of the timing of the transmission resumption (i.e., the time when data reception from the communication system A starts overlapping with radio wave transmission and reception with the communication system B in the dual mobile station 302) (step S1010).

Here, the timing may be reported to the system A base station controller 106, if the dual mobile station 302 has an accurate timing device utilizing the GPS or the like. Alternatively, the timing can be calculated back from the time when the radio control apparatus 303 receives radio waves from the dual mobile station 302, and the calculated timing may be reported to the system A base station controller 106.

Receiving the notification of the timing of the transmission resumption in step S1010, the system A base station controller 106 immediately stops the data transmission, and accumulates the transmission data directed to the dual mobile station 302 after the notified timing (step S1011).

The notification issued in step S1010 reaches the system A base station controller 106 later than the actual timing of the transmission of the notification. However, the accumulation in step S1011 is carried out by separately storing the replica of the transmission data buffered for resend control after the notified timing.

Through the procedures of steps S1009 through S1011, the system A base station controller 106 stores the transmission data after the radio wave transmission and reception are resumed, i.e., after the time when the radio wave transmission and reception in the communication system B starts overlapping with the data transmission and reception in the communication system A. Thus, when the next data transmission starts (i.e., at the start of the next transmission OFF state under VOX control), the system A base station controller 106 can resume the data transmission, starting from the data that were being transmitted at the time of the resumption of radio wave transmission and reception.

In a case where this embodiment is combined with any of the first to third embodiments, the dividing process and/or the compressing process may be performed when audio communication overlaps with data transmission during the transmission process of one unit of transmission data.

As described above, in accordance with this embodiment, even if transmission data are lost at the dual mobile station due to interference caused by a multi call, the data stored since the multi call started and the interference might have been caused can be resent from the base station in the next data transmission process. Thus, the data loss at the dual mobile station can be compensated for by simply resending the stored transmission data from the radio control apparatus, instead of from the origin of the transmission.

Instead of issuing the instruction in step S1004, the system A base station controller 106 may monitor the communication state between the dual mobile station 302 and the system B base station 203. The monitoring can be carried out through a cable line, a radio line, or a network. In such a case, instead of receiving the notification in step S1007, the system A base station controller 106 senses, through a cable line, a radio line, or a network, that the radio wave transmission and reception between the dual mobile station 302 and the system B base station 203 are intermitted.

Also, in the above description of this embodiment, the data accumulation in step S1011 is carried out by accumulating data transmitted later than the notified timing of the transmission resumption. However, the timing of resuming the accumulation is not limited to the notified timing, because the objective of this operation is to resend the data transmitted later than the notified timing without a request for resending, and thereby to restrict resend control. The accumulation may start earlier than notified timing, for example. Furthermore, all of or a part of the accumulated data in the above accumulation process may not necessarily be resent, if there is no need to resend lost data from the dual radio control apparatus 303 after a resend control operation or the like.

Figure 11:
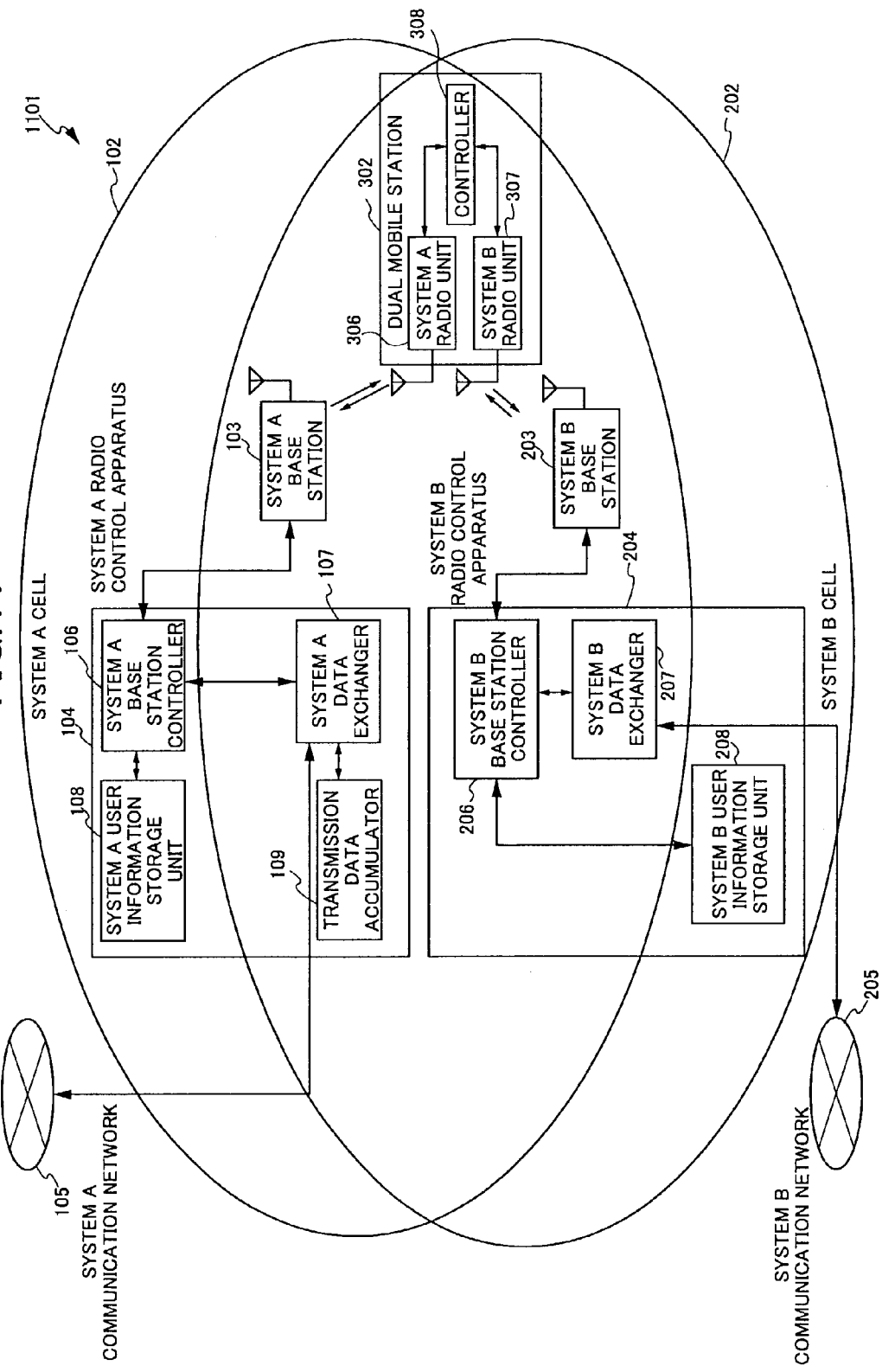
FIG. 11 schematically illustrates the entire structure of a communication system in accordance with yet another embodiment of the present invention.

Although the first through fourth embodiments described above have been described in conjunction with the mobile communication system 301 provided with the dual radio control apparatus 303, the present invention is not limited to those embodiments. As shown in FIG. 11, the present invention may also be applied to a communication system such as a mobile communication system 1101 provided with various radio control apparatuses for various communication systems.

In the example structure shown in FIG. 11, the system A radio control apparatus 104 and the system B radio control apparatus 204 should preferably be connected to each other via a cable line, a radio line, or a network, so that information can be exchanged between the system A radio control apparatus 104 and the system B radio control apparatus 204, whenever necessary. Particularly, the user information storage units 108 and 208 should be able to transmit the user communication patterns and data, such as the audible rates and the average silent periods, to each other in any of the foregoing embodiments. The user information and data may be, of course, set and stored in the user information storage units 108 and 208 in advance.

Although data communication of the communication system A is controlled during audio communication of the communication system B in the first to fourth embodiments described above, the present invention is not limited to those embodiments. In a case where data transmission and reception are not being performed between the system B base station 203 and the dual mobile station 302 that are connected to each other with a radio line, the present invention can be applied to this situation instead of the "transmission OFF state under VOX control". More specifically, the present invention can also be applied, for example, to a situation in which e-mail messages or image data are not being transmitted though the line is connected (i.e., a DTX (Discontinuous Transmission) mode), or a situation in which transmission data are compressed and transmitted in search of a base station with which handover can be performed, but the compressed data are not transmitted over a predetermined period of time after the compression (i.e., a compression mode).

Further, in the first through fourth embodiments described above, the communication system A utilizes the W-CDMA/TDD method (uplink, downlink: 2,010 to 2,025 MHz), while the communication system B utilizes the W-CDMA/FDD method (uplink: 1,920 to 1,980 MHz, downlink: 2,110 to 2,170 MHz). Accordingly, the downlink frequency band area of the communication system A is relatively close to the uplink frequency band area of the communication system B, and communication performed by the communication system A might interfere with communication performed by the communication system B, especially, uplink communication performed by the communication system B.

However, the present invention is not limited to the above embodiments, and may be applied to a case where the downlink frequency band area of the communication system A is close to the downlink frequency band area of the communication system B, and communication performed by the communication system A might interfere with communication performed by the communication system B, especially, downlink communication performed by the communication system B. In such a case, the conditions for the communication system B to operate in any of the above embodiments switch from the uplink radio wave transmission state to the downlink radio wave transmission state.

Further, in the first through fourth embodiments described above, one unit of transmission data is a part of transmission data temporarily divided and/or compressed so that each unit of transmission data can be transmitted within the estimated silent period. However, it is also possible to estimate the length of a silent period and perform the dividing and/or compressing process in each transmission process.

Furthermore, in the first through fourth embodiments described above, the mobile communication system is compatible with multi-call services. However, the present invention can be applied not only to multi-call services, but also to any mobile communication system in which two communication systems utilizing different communication techniques have frequency band areas close to each other, and interference might be caused between communications performed by the two communication systems because these two communication systems are located in the vicinity of each other.

It should be noted that the present invention is not limited to the embodiments specifically disclosed above, but other variations and modifications may be made without departing from the scope of the present invention.

The present application is based on Japanese priority application No. 2002-089386 filed on Mar. 27, 2002 with the Japanese Patent Office, the entire contents of which are hereby incorporated by reference.

What is claimed is:

1. A radio control apparatus that performs communication with a mobile station using a first frequency band area and a second frequency band area in a mobile communication system, the mobile station performing control to stop radio wave transmission while maintaining a communication line when there is no data to be transmitted, the radio control apparatus comprising:
 a mobile station information storage unit that stores a communication pattern of the mobile station;
 a reception unit that receives a request for data transmission to the mobile station;
 a radio wave communication detecting unit that determines whether radio wave transmission and reception are being performed with the mobile station in a communication operation using the first frequency band area;
 a time decision unit that determines a transmission time for data transmission in a communication operation using the second frequency band area based on communication pattern information as to the mobile station that is a data transmission destination designated by the request for data transmission, the communication pattern information being stored in the mobile station information storage unit; and
 a transmission unit that transmits the requested data to the mobile station as the data transmission destination within the transmission time determined by the time decision unit, when the radio wave communication detecting unit determines that radio wave transmission and reception are not being performed in the communication operation using the first frequency band area, said first frequency band area at least partially overlapping said second frequency band area.

2. The radio control apparatus as claimed in claim 1, wherein the transmission unit includes a dividing unit that divides the requested data into a plurality of data units so that each data unit of the requested data can be transmitted within the transmission time determined by the time decision unit.

3. The radio control apparatus as claimed in claim 1, wherein the transmission unit includes a compressing unit that compresses the requested data so that the requested data can be transmitted within the transmission time determined by the time decision unit.

4. The radio control apparatus as claimed in claim 1, wherein the transmission unit includes a dividing and compressing unit that divides the requested data into a plurality of data units and compresses the requested data so that each data unit of the requested data can be transmitted within the transmission time determined by the time decision unit.

5. The radio control apparatus as claimed in claim 1, further comprising a determination unit that determines whether an audible rate of the mobile station is higher than a predetermined rate, based on the communication pattern information as to the mobile station,
 wherein, when the determination unit determines that the audible rate is higher than the predetermined rate, the mobile station is removed from a group of objects to be controlled.

6. The radio control apparatus as claimed in claim 1, further comprising a determination unit that determines whether an average silent period of the mobile station is shorter than a predetermined period of time, based on the communication pattern information as to the mobile station,
 wherein, when the determination unit determines that the average silent period is shorter than the predetermined period of time, the mobile station is removed from a group of objects to be controlled.

7. A method of controlling data communication of a radio control apparatus that performs communication with a mobile station using a first frequency band area and a second frequency band area in a mobile communication system, the mobile station performing control to stop radio wave transmission while maintaining a communication line when there is no data to be transmitted, the data communication control method comprising the steps of:
 receiving a request for data transmission to the mobile station;
 determining whether radio wave transmission and reception are being performed with the mobile station in a communication operation using the first frequency band area;
 determining a transmission time for data transmission in a communication operation using the second frequency band area, based on communication pattern information as to the mobile station that is a data transmission destination designated by the request for data transmission; and
 transmitting the requested data to the mobile station as the data transmission destination within the determined transmission time, when determining that radio wave transmission and reception are not being performed in the communication operation using the first frequency band area, said first frequency band area at least Partially overlapping said second frequency band area.

* * * * *